(12) United States Patent
Brent, Jr.

(10) Patent No.: US 8,524,299 B2
(45) Date of Patent: Sep. 3, 2013

(54) WET PET FOOD PRODUCTS COMPRISING A FIRST LAYER BONDED WITH A BASE FOOD

(75) Inventor: John Leslie Brent, Jr., Springboro, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1193 days.

(21) Appl. No.: 11/433,001

(22) Filed: May 12, 2006

(65) Prior Publication Data

US 2006/0263487 A1 Nov. 23, 2006

Related U.S. Application Data

(60) Provisional application No. 60/682,900, filed on May 20, 2005.

(51) Int. Cl.
*A23K 1/00* (2006.01)
*A23K 1/18* (2006.01)

(52) U.S. Cl.
USPC ............... 426/89; 426/94; 426/106; 426/131; 426/521; 426/805

(58) Field of Classification Search
USPC ................ 426/89, 94, 106, 131, 521, 805
See application file for complete search history.

(56) References Cited

U.S. PATENT DOCUMENTS

| | | | |
|---|---|---|---|
| 3,808,340 A | 4/1974 | Palmer | |
| 3,852,483 A | 12/1974 | Oborsh et al. | |
| 3,873,736 A * | 3/1975 | Palmer et al. | 426/92 |
| 3,898,345 A * | 8/1975 | Horrocks et al. | 426/274 |
| 3,965,268 A * | 6/1976 | Stocker et al. | 426/331 |
| 4,022,915 A | 5/1977 | Zukerman | |
| 4,039,689 A * | 8/1977 | Bone | 426/99 |
| 4,330,562 A | 5/1982 | Nassar et al. | |
| 4,508,741 A | 4/1985 | Corbett et al. | |
| 4,781,939 A * | 11/1988 | Martin et al. | 426/646 |
| 5,527,549 A | 6/1996 | Bernacchi et al. | |
| 5,593,717 A * | 1/1997 | Huber et al. | 426/656 |
| 6,171,640 B1 | 1/2001 | Bringe | |
| 6,277,435 B1 * | 8/2001 | Lacombe et al. | 426/646 |
| 6,451,553 B1 * | 9/2002 | Olsen | 435/68.1 |
| 6,582,740 B1 * | 6/2003 | May et al. | 426/90 |
| 2001/0041202 A1 * | 11/2001 | Dupont et al. | 426/407 |
| 2004/0037943 A1 | 2/2004 | Saylock et al. | |
| 2006/0051492 A1 * | 3/2006 | Mueller et al. | 426/656 |

FOREIGN PATENT DOCUMENTS

| | | |
|---|---|---|
| EP | 0 258 037 A | 3/1988 |
| EP | 1 527 699 A | 5/2005 |
| EP | 1527699 A1 * | 5/2005 |
| EP | 1 618 791 A | 1/2006 |
| GB | 1 486 864 A | 9/1977 |
| GB | 1486864 | 9/1977 |
| GB | 2041717 | 9/1980 |
| GB | 1 583 644 A | 1/1981 |
| WO | WO 9805218 A1 * | 2/1998 |
| WO | WO 99/45794 | 9/1999 |
| WO | WO 99/45794 A | 9/1999 |
| WO | WO 0117366 A1 * | 3/2001 |

OTHER PUBLICATIONS

RD207031A, Jul. 1981, RD, Anon*
PCT International Search Report dated Sep. 26, 2006—6 pgs.
All Office Actions, U.S. Appl. No. 11/433,293.
All Office Actions, U.S. Appl. No. 11/433,275.
U.S. Appl. No. 11/433,293, filed May 12, 2006, John Leslie Brent, Jr. et al.
U.S. Appl. No. 11/433,275, filed May 12, 2006, John Leslie Brent, Jr. et al.

* cited by examiner

*Primary Examiner* — Chhaya Sayala
(74) *Attorney, Agent, or Firm* — Alexandra S. Anoff

(57) ABSTRACT

The wet pet food product of the present invention has more appeal to a consumer and ease of access for a pet. The wet pet food product contains a base food; a first layer; optionally a coating associated with said base food; and wherein said first layer is bonded with the base food.

26 Claims, No Drawings

WET PET FOOD PRODUCTS COMPRISING A FIRST LAYER BONDED WITH A BASE FOOD

CROSS REFERENCE TO RELATED APPLICATIONS

This application claims the benefit of U.S. Provisional Application No. 60/682,900, filed May 20, 2005.

FIELD OF THE INVENTION

The present invention relates to a wet pet food product. The invention further relates to methods for preparing a wet pet food product, more particularly to a method for preparing a wet pet food product that presents a desirable appearance to a consumer and easy to access and manage by a pet.

BACKGROUND OF THE INVENTION

Pet foods are generally manufactured and available in dry, moist and semi-moist formulations. While flavorings and aroma modifiers are used to improve palatability, wet pet foods often suffer from lack of appeal to consumers. Other disadvantages of the current components of wet pet foods include undesirable color, unpleasant odor and sometimes hard cores that do not appear to be real meat products.

Several attempts to produce a reconstituted meat product having the qualities of a piece of primal meat made by bonding together small meat pieces that would appeal to a pet and a consumer have been attempted. One such example attempts to mimic longitudinally extending muscle fibers found in primal meat, it has been proposed in the past to bond and to orient the fibers of reconstituted meat to mimic that of primal meat. Another example attempts a process and device for bonding meat or the like in a rotating drum with a horizontal axis.

A variety of attempts for producing an ergonomically improved pet food product have been undertaken. One such example, a meat product is formed by bonding the meat pieces in elongate form and arranging the meat pieces in a substantially helical array to mimic meat fibers.

While much effort has been made to produce an appealing meat product that are attractive and easy to access and manage by a pet, the need still remains for a pet food product that shows the coherence exhibited by natural meat products while still maintaining appeal to a consumer and ease of access for a pet.

It is therefore an object of the present invention to provide a pet food product that is a desirable appearance to a consumer and easy to access and manage by a pet. This pet food product allows for a product that is attractive in appearance, provides improved texture, conceals odor and forms an ergonomically improved pet food product.

SUMMARY OF THE INVENTION

The present invention relates to a wet pet food product comprising: a base food; a first layer; optionally a coating associated with said base food; and wherein said first layer is bonded with said base food.

The present invention further relates to a wet pet food product comprising: a base food comprising a steam tunnel meat; a first layer comprising textured wheat protein; a coating associated with said base food; and wherein said first layer is bonded with said base food.

The present invention is also directed to non-limiting methods of preparing the wet pet food products as described above.

DETAILED DESCRIPTION OF THE INVENTION

The wet pet food product of the present invention comprises a base food; a first layer; optionally a coating associated with said base food; and wherein said first layer is bonded with said base food.

These and other limitations of the compositions and methods of the present invention, as well as many of the optional ingredients suitable for use herein, are described in detail hereinafter.

As used herein, the term "adapted for use" means that the pet food products described can meet the American Association of Feed Control Officials (AAFCO) safety requirements for providing pet food products for a pet as may be amended from time to time.

As used herein, the term "agglomerate(s)", unless otherwise specified, comprise a plurality of particles wherein the particles can be physically and/or chemically, irreversibly and/or reversibly, adhered together to form a discrete body of matter. As used herein, the term "adhered", unless otherwise specified, means the particles are physically and/or chemically bound or bonded together.

As used herein, "associated with the" "base food" or "product" or "agglomerate", unless otherwise specified, means a coating that is applied to or inside of the base food, product or agglomerate, permeated into the base food, product or agglomerate, coated onto, or within or adjacent to the base food, product or agglomerate or integral to the base food, product or agglomerate or embedded to the base food, product or agglomerate. The first or additional coating may also be "associated with the" with the edible core and/or agglomerate in whole or in part.

The term "complete and nutritionally balanced" as used herein, unless otherwise specified, refers to a pet food product having all known required nutrients in proper amounts and proportions based upon the recommendation of recognized authorities in the field of pet nutrition.

As used herein, the term "base food" means a material intended for use in a pet food that has been processed, manipulated, or formed into an object of visible shape and of definable dimensions whether regular or irregular.

As used herein, the term "bonded" means substantially attached in such a manner that the first or additional layer and/or first or additional agglomerate, as applicable, is applied to or inside of the base food, permeated into the base food, coated onto, within or adjacent to the base food or integral to the base food. The first or additional layer may also be "bonded" with the agglomerate. The first or additional layer may also be "bonded" with the base food and/or agglomerate in whole or in part. Accordingly, a first or additional layer may be "bonded" with the base food and/or agglomerate to vary the size, shape and overall appearance of the wet pet food product. Additionally, a first or additional agglomerate may be "bonded" with a second or additional agglomerate.

As used herein the term "wet" pet food product means the pet food product can be moist and/or semi-moist.

All percentages, parts and ratios as used herein are by weight of the total product, unless otherwise specified. All such weights as they pertain to listed ingredients are based on the active level and, therefore do not include solvents or by-products that may be included in commercially available materials, unless otherwise specified.

The wet pet food product and methods of the present invention can comprise, consist of, or consist essentially of, the essential elements and limitations of the invention described herein, as well as any additional or optional ingredients, components, or limitations described herein or otherwise useful in wet pet food product intended for animal consumption.

Product Form

The pet food product of the present invention is typically in the form of a wet pet food product. The wet pet food products of the present invention can be a semi-moist pet food products (i.e. those having a total moisture content of from 16% to 50%, by weight of the product), and/or a moist pet food products (i.e. those having a total moisture content of greater than 50%, by weight of the product). Unless otherwise described herein, semi-moist pet food product, and moist pet food products are not limited by their composition or method of preparation.

The wet pet food products herein can be complete and nutritionally balanced. A complete and nutritionally balanced wet pet product may be compounded to be fed as the sole ration and is capable of maintaining the life and/or promote reproduction without any additional substance being consumed, except for water.

The wet pet food products and components of the present invention are selected for consumption by a pet and are not intended for consumption by humans. Non-limiting examples of wet pet food products include dog food products and cat food products.

In an embodiment of the present invention the wet pet food product comprises a base food; a first layer; a coating associated with said base food; and wherein said first layer is bonded with said base food. In an alternative embodiment of the present invention the wet pet food product comprising: a base food comprising a steam tunnel meat; a first layer comprising textured wheat protein; a coating associated with said base food; and wherein said first particle is bonded with said base food. The present invention enhances ease of access and manageability by a pet and improved attractiveness to a consumer. The coating improves the attractiveness to the consumer as well as the pet. The wet pet food product is preferably housed in a containing device comprising a substantially transparent portion suitable for viewing the wet pet food product.

Base Food

The wet pet food product comprises a base food. The base food can have a coating associated with the base food. The base food can comprise a structurant that is selected from the group consisting of animal protein, plant protein, farinaceous matter, vegetables, fruit, and combinations thereof.

Additionally, the base food can have a first layer bonded to the base food. In an embodiment of the present invention the base food can have a coating associated with the base food and a first layer bonded to the textured material. The base food can be processed by a variety of well-known means including steam tunnel, extrusion, freeze-texturization, baking, gelling, retort, microwave heating, and combinations thereof. The structurant can be an extruded protein. The base food can be a cube, irregular, elongated, cylindrical, spherical, geometric shapes, axially elongated, and combinations thereof.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal, or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

Fruits are commonly known in the pet food industry. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

The animal protein described above can contain significant levels of microbes. These microbes must be killed before commercial distribution. A variety of well-known techniques are available for this purpose. Non-limiting examples include; heating, pressurizing, depressurizing, and shearing.

The base food can have a volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

The base food can have a Moisture Content in the range of from about 16% to about 92%. Preferably the textured material has a Moisture Content of at least about 20%, more preferably at least about 25%, even more preferably at least about 30%, even more preferably at least about 35%, still more preferably at least about 40%, still even more preferably at least about 50%, still even more preferably at least about 60%, still even more preferably at least about 70%, as measured by the Moisture Content Method described hereafter.

The base food can have a density of from about 0.1 to about 3 g/cc, preferably at least about 0.8 g/cc, more preferably at least about 1.01 g/cc, even more preferably at least about 1.04 g/cc, as measured by the Density Method described hereafter.

A First Layer

The wet pet food product can comprise a first layer. The first layer can comprise a plurality of particles. The plurality of particles can be adhere together to form a first layer. Methods of adhering the plurality of particles include, but are not limited to, compressing molding, shaking, extruding, heating, and combinations thereof. Wherein the particles can be physically and/or chemically adhere. The particles can be at least about 5 to about 600 microns in size, as measured in at least one axis.

The first layer can be bonded with the base food. For example in an embodiment having the first layer bonded with the base food a stable wet food product is formed. The methods of bonding the first layer with the base food of the present invention, include, but are not limited to, compressing, molding, shaking, extruding, heating, and combinations thereof. The resulting wet pet food product can have varying shapes, sizes and appearance. A coating, as described hereafter, can be used when a first layer is bonded with a base food.

The first layer and/or plurality of particles is selected from the group consisting of animal protein, plant protein, farinaceous matter, vegetables, fruit and combinations thereof. The first layer can be processed by a variety of well-known means including steam tunnel, extrusion, freeze-texturization, baking, gelling, retort, and combinations thereof. Examples of the first layer include steam tunnel meat, extruded meat, partially cooked meat, baked meat, gelled meat, retort processed meat and combinations thereof. The first layer can be shredded from about 2 millimeters to about 30 millimeters in size, as measured in at least one axis, preferably from about 3 millimeters to about 20 millimeters in size, more preferably from about 6 millimeters to about 15 millimeters in size, as measured in at least one axis.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal, or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein, for example a textured wheat protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, soy, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

Fruits are commonly known in the pet food industry. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

Coating

The wet pet food product comprises a base food that can have a first coating associated with the base food. The coating can comprise a binder.

When present, the coating comprises from about 0.01% to about 100%, by weight of the coating, of said binder. Preferably the coating comprises from about 1% to about 50%, more preferably from about 2% to about 35%, even more preferably from about 4% to about 20%, by weight of the coating, of said binder.

Nonlimiting examples of binders include egg-based materials (including egg whites and preferably dried egg whites), undenatured proteins, food grade polymeric adhesives, gels, polyols, starches (including modified starches), gums, and mixtures thereof.

Nonlimiting examples of polyols include sugar alcohols such as disaccharides and complex carbohydrates. Certain complex carbohydrates are referred commonly as starches. Disaccharides are molecules having the general formula $C_nH_{2n-2}O_{n-1}$, wherein the disaccharide has 2 monosaccharide units connected via a glycosidic bond. In such formula, n is an integer equal to or greater than 3.

Nonlimiting examples of disaccharides which may be utilized herein include sucrose, maltose, lactitol, maltitol, maltulose, and lactose.

Nonlimiting examples of complex carbohydrates include oligosaccharides and polysaccharides. As used herein, the term "oligosaccharide" means a molecule having from 3 to 9 monosaccharide units, wherein the units are covalently connected via glycosidic bonds. As used herein, the term "polysaccharide" means a macromolecule having greater than 9 monosaccharide units, wherein the units are covalently connected via glycosidic bonds. The polysaccharides may be linear chains or branched. Preferably, the polysaccharide has from 9 to about 20 monosaccharide units. Polysaccharides may include starches, which is defined herein to include starches and modified starches. Starches are generally carbohydrate polymers occurring in certain plant species, for example, cereals and tubers, such as corn, wheat, rice, tapioca, potato, pea, and the like. Starches contain linked alpha-D-glucose units. Starches may have either a mainly linear structure (e.g., amylose) or a branched structure (e.g., amylopectin). Starches may be modified by cross-linking to prevent excessive swelling of the starch granules using methods well-known to those skilled in the art. Additional examples of starches include potato starch, corn starch, and the like. Other examples of commercially available starches include ULTRA SPERSE M™, N-LITE LP™, and TEXTRA PLUS™, all available from National Starch and Chemical Company, Bridgewater, N.J.

Nonlimiting examples of preferred complex carbohydrates include raffinose, stachyoses, maltotriose, maltotetraose, glycogen, amylose, amylopectin, polydextrose, and maltodextrin.

The coating can optionally further comprise an additional component. Nonlimiting examples of additional components include wheat protein, soy protein, lupin protein, protein flour, textured wheat protein, textured soy protein, textured lupin protein, textured vegetable protein, breading, comminuted meat, flour, comminuted pasta, pasta, water, flavorants, starches, seasoning salts, colorants, time-release compounds, minerals, vitamins, antioxidants, prebiotics, probiotics, aroma modifiers, flavor modifiers, and combinations thereof.

Agglomerates

The wet pet food product of the present invention can comprise a first agglomerate and/or one or more additional agglomerates. An agglomerate can comprise a plurality of particles wherein the particles are adhered together to form the agglomerate. The agglomerate can be bonded with the base food which can change the shape, size, texture, appearance, density and volume of the base food.

The wet pet food product of the present invention may comprise one or more additional agglomerate that can be bonded with the product, base food, first layer and/or another agglomerate which one having ordinary skill in the art would recognize as separate and distinct from the first agglomerate. These additional agglomerates may also be referred to as consecutively numbered agglomerates in addition to the first agglomerates of the present invention, e.g., second agglomerates, third agglomerates, etc.

An agglomerate can be a variety of sizes and shapes. The agglomerate can have a volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

The agglomerate comprising a plurality of particles is selected from the group consisting of animal protein, plant protein, farinaceous matter, vegetables, fruit and combinations thereof.

The particles can be processed by a variety of well-known means including steam tunnel, extrusion, freeze-texturization, baking, gelling, retort, and combinations thereof. Examples of the particles include steam tunnel meat, extruded meat, partially cooked meat, baked meat, gelled meat, retort processed meat and combinations thereof.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal, or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein, for example a textured wheat protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, soy, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

Fruits are commonly known in the pet food industry. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

The agglomerates can optionally further comprises an additional component. Nonlimiting examples of additional components include textured wheat protein, textured soy protein, textured lupin protein, textured vegetable protein, breading, comminuted meat, flour, comminuted pasta, water, flavorants, seasoning salts, colorants, time-release compounds, minerals, vitamins, antioxidants, prebiotics, probiotics, aroma modifiers, flavor modifiers, and combinations thereof.

Additional Layers

In another embodiment, the wet pet food product of the present invention and/or the agglomerates of the present invention may comprise one or more additional layers that can be bonded with the product, base food and/or the agglomerate which one having ordinary skill in the art would recognize as separate and distinct from the first layer. These additional layers may also be referred to as consecutively numbered layers in addition to the first layer of the present invention, e.g., second layer, third layer, etc. Suitable additional layers may comprise those materials which are disclosed above as suitable for the first layer.

Additional Coatings

In another embodiment, the wet pet food product of the present invention and/or the agglomerates of the present invention may comprise one or more additional coatings that can be associated with the product, base food and/or the agglomerate which one having ordinary skill in the art would recognize as separate and distinct from the first coating. The additional coating can provide a non-glossy appearance to the surface of the wet pet food product and/or agglomerate, thereby providing a wet pet food product with improved appearance of freshness and improved attractiveness to one or both of the consumer or the pet. In any instance, these additional coatings may also be referred to as consecutively numbered coatings in addition to the first coating of the present invention, e.g., second coating, third coating, etc. Suitable additional coating may comprise those materials which are disclosed above as suitable for the first coating.

Optional Ingredients

The wet pet food product of the present invention can further comprise a wide range of other optional ingredients. These optional ingredients can be present as part of the agglomerate.

Nonlimiting examples of optional ingredients can include at least one vegetable. Nonlimiting examples of vegetables include carrots, peas, potatoes, cabbage, celery, beans, corn, tomatoes, broccoli, cauliflower, onion, garlic, leeks and combinations thereof.

Also useful herein, as an optional ingredient, is a filler. The filler can be a solid, a liquid or packed air. The filler can be reversible (for example thermo-reversible including gelatin) and/or irreversible (for example thermo-irreversible including egg white). Nonlimiting examples of the filler include gravy, gel, jelly, aspic, sauce, water, air (for example including nitrogen, carbon dioxide, and atmospheric air), broth, and combinations thereof.

Also useful herein, as an optional ingredient, is one or more colorants. Nonlimiting examples colorants include, but are not limited to, synthetic or natural colorants, and any combination thereof A colorant can be malt for brown coloring, titanium dioxide for white coloring, or tomato extract (e.g. lycopene) for red coloring, alalpha (e.g. chlorophyll) for green coloring, algal meal for green coloring, caramel for brown coloring, annatto extract (e.g. bixin, transbixin, and norbixin and combinations thereof) for about yellow-orange color, dehydrated beets for about red-purple coloring, ultramarine blue for about blue-green color, β-carotene for about orange coloring, tagetes (e.g. lutein) for about orange coloring, tumeric for about yellow coloring, tumeric oleoresin for about yellow coloring, saffron for about yellow coloring, corn gluten meal for about yellow coloring, paprika for about red coloring, paprika oleoresin for about orange-red coloring, black iron oxide for about black coloring, brown iron oxide for about brown coloring, red iron oxide for about red coloring, yellow iron oxide for about yellow coloring, red cabbage for about red-purple coloring, carbon black for about black coloring, cochineal extract for about red coloring, carrot oil for about yellow coloring, FD&C Blue No. 1 (Brilliant Blue) for about green-blue coloring, FD&C Blue No. 2 (Indigotine) for about a deep blue coloring, FD&C Green No. 3 (Fast Green) for about blue-green coloring, FD&C Red No. 3 (Erythrosine) for about blue-red coloring, FD&C Red No. 40 (Allura Red) for about yellow-red coloring, FD&C Yellow No. 5 (Tartrazine) for about lemon-yellow coloring, FD&C Yellow No. 6 (Sunset Yellow) for about red-yellow coloring, fruit juice concentrate for inherent coloring (e.g. orange juice concentrate for about orange coloring), grape color extract for red-blue coloring, xanthophylls (e.g. extracted from broccoli) for about green coloring, vegetable juice for inherent coloring (e.g. beet juice for red-purple coloring), riboflavin for about green-yellow coloring, Orange B for about orange coloring, and octopus and squid ink for about black coloring The coated pet food product comprises from about 0.00001% to about 10%, by weight of the product, of said colorant. Preferably coated pet food product comprises from about 0.0001% to about 5%, more preferably from about 0.001% to about 1%, even more preferably from about 0.005% to about 0.1%, by weight of the product, of said colorant.

Also useful herein, as an optional ingredient, is one or more additional components. Nonlimiting examples include textured wheat protein, textured soy protein, textured lupin protein, textured vegetable protein, breading, comminuted meat, flour, comminuted pasta, water, flavorants, seasonings, salts, time-release compounds, minerals, vitamins, antioxidants, prebiotics, probiotics, aroma modifiers, and combinations thereof.

Also useful herein, as an optional ingredient, is at least one fruit. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

Method of Manufacture

The wet pet food product of the present invention may be prepared by any known or otherwise effective technique, suitable for making and formulating the desired wet pet food product. It is effective to manufacture the wet pet food product comprising the process of: (a) providing a base food; (b) providing a first layer; (c) bonding said base food and said first layer; (d) heating said pet food product until said layer is heat set; and (e) heating said pet food product until all microbes are killed. The wet pet food product can optionally have a coating associating with said base food. The wet pet food product can optionally heat said pet food product until said coating is heat set The wet pet food product can optionally have a second layer bonded or second coating associated with the base food.

Density Method

This method measures density of the base food and/or an agglomerate. Density is assessed via immersion in distilled water at 21.5° C.

The apparatus for measuring density of the base food and/or the agglomerate via immersion in a fluid is described herein. An analytical balance, accurate to at least 0.001 g, has the top loading balance pan removed. Affixed on the balance pan is the frame. If the analytical balance is equipped with a guard along the perimeter of the pan, the guard is removed as to not interfere with placement of the pan and frame on the balance load cell. The pan and frame assembly are placed on the balance load cell. A platform is placed astraddle the pan and not touching the frame or the pan. A beaker (e.g. 500 ml) is filled with 21.5° C. distilled water (e.g. 500 ml). The beaker and water are placed on the platform in a manner to not touch the frame, preferably centered. Two sample stages are used in this step. The upper sample stage (upper stage) is affixed at the upper center and horizontal portion of the frame. The lower sample stage (lower stage) should be submerged to a depth sufficient so that when a sample is placed on the lower stage the sample is submerged completely. A thermometer is affixed along the inside wall of the beaker. Once equilibrated, the temperature of the distilled water is recorded from the thermometer. The analytical balance is tared. If need be, beaker size, scale size, and water depth can be adjusted for base food and/or the agglomerate weight and different sizes.

i. Non-Floating Base Food and/or the Agglomerate

The base food and/or the agglomerate weight is determined when placed at each stage location. Using forceps with minimal grasping force, the base food and/or the agglomerate is placed on the upper sample stage. The weight is recorded as the Weight of the base food and/or the agglomerate in Air (A). Using forceps with minimal grasping force, the base food and/or the agglomerate is removed from the upper sample stage, the analytical balance is tared, and the base food and/or the agglomerate is placed on the lower sample stage so that the base food and/or the agglomerate is completely submerged and is freely resting on the lower sample stage. The base food and/or the agglomerate is positioned to be freely resting on the lower sample stage so that all weight is carried by the lower sample stage. If the base food and/or the agglomerate remains on the lower sample stage, the Weight of the base food and/or the agglomerate in Distilled Water (W) is recorded.

ii. Floating Base Food and/or the Agglomerate

If the base food and/or the agglomerate floats to the surface, the base food and/or the agglomerate is removed from the distilled water. The lower sample stage is replaced with a buoyant body sample stage. The buoyant body sample stage is perforated to allow trapped air to float to the surface of the water but with perforations smaller than the base food and/or the agglomerate. When the buoyancy of the base food and/or the agglomerate is greater than the weight of the buoyancy body sample stage, the buoyant body sample stage must be weighted by placing an additional weight on top of the upper stage such that the buoyant body sample stage, the upper stage with weight, and frame act as one unit with no moving parts. Tare the balance and conduct the density measurement as above (i) for non-floating base food and/or the agglomerate. A new base food and/or the agglomerate is chosen, and the step is repeated to determine and record the Weight of the base food and/or the agglomerate in Air (A) on the upper sample stage, the balance is tared, and then subsequent weight immersed (W), where W is now a negative number and is recorded as such.

The density of distilled water at 21.5° C. is 0.99788 based on standard pressure conditions of 1 atmosphere from E. W. Lemmon, M. O. McLinden and D. G. Friend, "Thermophysical Properties of Fluid Systems" in NIST Chemistry WebBook, NIST Standard Reference Database Number 69, Eds. P. J. Linstrom and W. G. Mallard, March 2003, National Institute of Standards and Technology, Gaithersburg Md., 20899 (http://webbook.nist.gov).

Base food and/or the agglomerate density is calculated as follows:

$$\text{base food and/or the agglomerate density}(g/cc) = \text{Density of distilled water }(g/cc) \times [(A)/(A-W)]$$

Volume Method

Volume is calculated based on the first principle relationship to density and mass. Using the values obtained from the Density Method discussed previously one can calculate the Volume of the base food and/or the agglomerate.

base food and/or the agglomerate Volume is calculated as follows:

$$\text{base food and/or the agglomerate Volume}(cc) = (A)(g)/\text{base food and/or the agglomerate density}(g/cc)$$

Moisture Content Method

The method involves the analysis of moisture content in the base food and/or wet pet food product. The analysis is based on the procedure outlined in AOAC method 930.15 and AACC method 44-19.

A wet pet food product sample is prepared by taking one unit volume, for example, a 375 gram can of product, and homogenizing in a food processor to a uniform consistency like a paste. A wet pet food product sample larger than 375 gram would be subdivided to create equal and representative fractions of the whole such that a 375 gram sample is obtained.

Additionally, the moisture content of the base food can be determined by obtaining a base food sample for example from the process line. The base food sample is handled in a manner to prevent spoilage or loss or gain of moisture. The base food sample is processed so as to obtain a 375 gram sample. The base food sample is homogenizing in a food processor to a uniform consistency like a paste.

The pastes of the wet pet food product and the base food samples are individually sampled in triplicate at a volume less than or equal to 100 ml and placed individually sealed in a 100 ml Nasco Whirl-Pak® (Fort Atkinson, Wis. 53538-0901). During the process of sealing the Whirl-Pak®, excess air is evacuated manually from the container just prior to final closure thereby minimizing the container headspace. The Whirl-Pak® is closed per manufacturer's instructions—tightly folding the bag over three (3) times and bending the tabs over 180 degrees.

All samples are refrigerated at 6° C. for less than 48 h prior to moisture analysis.

For moisture analysis, the tare weight of each moisture tin and lid are recorded to 0.0001 g. Moisture tins and lids are handled using dry and clean forceps. Moisture tins and lids are held dry over desiccant in a sealed desiccator. A Whirl-Pak® containing a sample is unfolded and a 2.0000+/−0.2000 gram sample is weighed into the uncovered moisture tin. The weight of the sample in the moisture tin is recorded. The lid is placed atop the moisture tin in an open position to allow moisture loss but contain all other material during air oven drying. The lid and moisture tin loaded with sample are placed in an air oven operating at 135° C. for 6 h. Time is tracked using a count-down timer.

After drying, the tin is removed from the oven and the dried lid is placed atop the tin using forceps. The covered moisture tin with dried sample is placed immediately in a desiccator to cool. The sealed desiccator is filled below the stage with active desiccant. Once cool to room temperature, the covered moisture tin with dried sample is weighed to 0.0001 g and weight recorded. The moisture content of each sample is calculated using the following formula:

Moisture Content(%)=100−(weight of tin, lid and sample after drying−empty tin and lid weight)× 100/initial sample weight It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

EXAMPLES

The following examples further describe and demonstrate embodiments within the scope of the invention. The examples are given solely for the purpose of illustration and are not to be construed as limitations of the present invention, as many variations thereof are possible without departing from the spirit and scope of the invention.

|  | Wet Pet Food Product Examples: | | | | | | |
| --- | --- | --- | --- | --- | --- | --- | --- |
|  | Ex. 1 | Ex. 2 | Ex. 3 | Ex. 4 | Ex. 5 | Ex. 6 | Ex. 7 |
| Base food | Ex. 26 | Ex. 24 | Ex. 22 | | | | |
| Base food % | 26.65 | 22.63 | 23.27 | | | | |
| Base food + First Coating | | | | | | | |
| Base Food | | | | | Ex. 35 | | |
| Base food % | | | | | 26.65 | | |
| First Coating | | | | | Ex. 44 | | |
| First Coating % | | | | | 5.24 | | |
| Base food + First Layer | | | | | | | |
| Base Food | | | | | Ex. 25 | | |
| Base food % | | | | | 26.78 | | |
| First Layer | | | | | Ex 57 | | |
| First Layer % | | | | | 4.80 | | |
| Base food + First Coating + First Layer | | | | | | | |
| Base Food | | | | | | Ex. 23 | |
| Base food % | | | | | | 25.94 | |
| First Coating | | | | | | Ex. 46 | |
| First Coating % | | | | | | 3.11 | |
| First Layer | | | | | | Ex. 60 | |
| First Layer % | | | | | | 4.65 | |
| Base food + First Coating + First Layer + Second Coating | | | | | | | |
| Base Food | | | | | | | Ex. 24 |
| Base food % | | | | | | | 25.67 |
| First Coating | | | | | | | Ex. 43 |
| First Coating % | | | | | | | 3.08 |
| First Layer | | | | | | | Ex. 58 |
| First Layer % | | | | | | | 4.60 |
| Second Coating | | | | | | | Ex. 41 |
| Second Coating % | | | | | | | 1.06 |
| First Agglomerate | Ex. 37 | Ex. 38 | | | | | |
| First Agglomerate % | 5.25 | 13.76 | | | | | |
| Second Agglomerate | | | Ex. 48 | | | | |
| Second Agglomerate % | | | 17.27 | | | | |
| Filler | Ex. 81 | Ex. 80 | Ex. 81 | Ex. 79 | Ex. 77 | Ex. 82 | Ex. 85 |
| Filler % | QS | QS | QS | QS | QS | QS | QS |
| Optional Ingredients | Ex. 70 | Ex. 73 | Ex. 70 | Ex. 75 | Ex. 71 | Ex. 69 | Ex. 74 |
| Optional Ingredients % | 7.25 | 11.94 | 6.33 | 7.25 | 7.29 | 7.06 | 6.98 |
| Weight Fraction | 0.391 | 0.483 | 0.469 | 0.391 | 0.388 | 0.408 | 0.414 |
| Base food moisture content | 59.23 | 59.23 | 59.23 | 59.23 | 59.23 | 59.23 | 59.23 |

Examples 1-7 can be prepared by admixing base food with agglomerates, filler, and optional ingredients. The base food can be made first, by preparing a meat slurry by mixing the ingredients and emulsifying, forming the slurry into a shape, and cooking using steam at 100° C. to set the structure of the base food and followed by cutting the structure into 1.6 cm cubes. In Ex. 4, the base food can be partially coated with the First Coating by batch tumbling and in Ex. 6-7 the base food can be wholly coated with the First Coating by batch tumbling. In Ex. 5, base food can be wholly coated by brushing to create the First Layer on the base food. In Ex. 6 the base food can be sequentially processed to coat (by batch applying with a tumbler the First Coating and then the First Layer. In Ex. 7, enhancements are made to the base food by preparing the base food, First Coating, and First Layer in the same manner as Ex. 6, followed by adding the Second Coating sequentially, after the First Coating. In Examples 1-7, after the last coating or layer can be added, the structure of the coatings and layers are set by heating in a steam tunnel using 1 atm steam until a center temperature of 67° C. is reached. After the base food of Ex. 1-7 have been set, the base foods are stirred with the filler and optional ingredients, blended using low shear until the mixture is homogeneous, filled into a package and heat sterilized in a retort.

|  | Wet Pet Food Product Examples: | | | | | | |
|---|---|---|---|---|---|---|---|
|  | Ex. 8 | Ex. 9 | Ex. 10 | Ex. 11 | Ex. 12 | Ex. 13 | Ex. 14 |
| Base Food |  | Ex. 33 |  |  |  |  |  |
| Base food % |  | 3.50 |  |  |  |  |  |
| Base food + First Coating + |  |  |  |  |  |  |  |
| First Layer |  |  |  |  |  |  |  |
| Base Food |  |  |  | Ex. 27 |  |  |  |
| Base food % |  |  |  | 10.60 |  |  |  |
| First Coating |  |  |  | Ex. 45 |  |  |  |
| First Coating % |  |  |  | 1.27 |  |  |  |
| First Layer |  |  |  | Ex. 59 |  |  |  |
| First Layer % |  |  |  | 1.90 |  |  |  |
| Base food + First Coating + First |  |  |  |  |  |  |  |
| Layer + Second Coating |  |  |  |  |  |  |  |
| Base Food | Ex. 30 |  |  |  | Ex. 31 | Ex. 32 |  |
| Base food % | 21.33 |  |  |  | 9.70 | 10.02 |  |
| First Coating | Ex. 47 |  |  |  | Ex. 41 | Ex. 41 |  |
| First Coating % | 2.56 |  |  |  | 1.16 | 1.20 |  |
| First Layer | Ex. 61 |  |  |  | Ex. 55 | Ex. 55 |  |
| First Layer % | 3.82 |  |  |  | 1.74 | 1.80 |  |
| Second Coating | Ex. 42 |  |  |  | Ex. 41 | Ex. 41 |  |
| Second Coating % | 0.88 |  |  |  | 0.40 | 0.42 |  |
| Base food + Optional |  |  |  |  |  |  |  |
| Ingredients + First Coating + First |  |  |  |  |  |  |  |
| Layer + Second Coating |  |  |  |  |  |  |  |
| Base Food |  |  |  |  |  |  | Ex. 24 |
| Base food % |  |  |  |  |  |  | 11.27 |
| Optional Ingredients |  |  |  |  |  |  | Ex. 73 |
| Optional Ingredients % |  |  |  |  |  |  | 3.07 |
| First Coating |  |  |  |  |  |  | Ex. 45 |
| First Coating % |  |  |  |  |  |  | 1.35 |
| First Layer |  |  |  |  |  |  | Ex. 59 |
| First Layer % |  |  |  |  |  |  | 2.02 |
| Second Coating |  |  |  |  |  |  | Ex. 45 |
| Second Coating % |  |  |  |  |  |  | 0.47 |
| Optional Ingredients + First |  |  |  |  |  |  |  |
| Coating + First Layer + |  |  |  |  |  |  |  |
| Second Coating |  |  |  |  |  |  |  |
| Optional Ingredients |  |  |  |  |  |  | Ex. 75 |
| Optional Ingredients % |  |  |  |  |  |  | 1.12 |
| First Coating |  |  |  |  |  |  | Ex. 45 |
| First Coating % |  |  |  |  |  |  | 0.49 |
| First Layer |  |  |  |  |  |  | Ex. 59 |
| First Layer % |  |  |  |  |  |  | 0.74 |
| Second Coating |  |  |  |  |  |  | Ex. 45 |
| Second Coating % |  |  |  |  |  |  | 0.17 |
| Base food + First Agglomerate + First |  |  |  |  |  |  |  |
| Coating + First Layer + Second Coating |  |  |  |  |  |  |  |
| Base Food |  |  |  |  |  |  | Ex. 24 |
| Base food % |  |  |  |  |  |  | 10.62 |
| First Agglomerate |  |  |  |  |  |  | Ex. 38 |
| First Agglomerate % |  |  |  |  |  |  | 6.46 |
| First Coating |  |  |  |  |  |  | Ex. 45 |
| First Coating % |  |  |  |  |  |  | 1.27 |
| First Layer |  |  |  |  |  |  | Ex. 59 |
| First Layer % |  |  |  |  |  |  | 1.90 |

|  | Wet Pet Food Product Examples: | | | | | | |
| --- | --- | --- | --- | --- | --- | --- | --- |
|  | Ex. 8 | Ex. 9 | Ex. 10 | Ex. 11 | Ex. 12 | Ex. 13 | Ex. 14 |
| Second Coating |  |  |  |  |  |  | Ex. 45 |
| Second Coating % |  |  |  |  |  |  | 0.44 |
| Base food + First Coating + First Layer + Second Coating + Second Layer + Third Coating |  |  |  |  |  |  |  |
| Base Food |  | Ex. 33 | Ex. 29 |  |  |  |  |
| Base food % |  | 15.30 | 9.85 |  |  |  |  |
| First Coating |  | Ex. 45 | Ex. 45 |  |  |  |  |
| First Coating % |  | 1.83 | 1.18 |  |  |  |  |
| First Layer |  | Ex. 56 | Ex. 59 |  |  |  |  |
| First Layer % |  | 2.74 | 1.77 |  |  |  |  |
| Second Coating |  | Ex. 45 | Ex. 41 |  |  |  |  |
| Second Coating % |  | 1.75 | 1.13 |  |  |  |  |
| Second Layer |  | Ex. 56 | Ex. 55 |  |  |  |  |
| Second Layer % |  | 2.74 | 1.77 |  |  |  |  |
| Third Coating |  | Ex. 45 | Ex. 41 |  |  |  |  |
| Third Coating % |  | 0.63 | 0.41 |  |  |  |  |
| First Coating + First Layer |  |  |  |  |  |  |  |
| First Coating | Ex. 47 | Ex. 45 |  |  |  |  |  |
| First Coating % | 0.42 | 0.42 |  |  |  |  |  |
| First Layer | Ex. 61 | Ex. 56 |  |  |  |  |  |
| First Layer % | 0.63 | 0.63 |  |  |  |  |  |
| First Coating + First Layer + Second Coating |  |  |  |  |  |  |  |
| First Coating |  |  |  |  |  | Ex. 41 |  |
| First Coating % |  |  |  |  |  | 1.69 |  |
| First Layer |  |  |  |  |  | Ex. 55 |  |
| First Layer % |  |  |  |  |  | 2.53 |  |
| Second Coating |  |  |  |  |  | Ex. 41 |  |
| Second Coating % |  |  |  |  |  | 0.84 |  |
| First Agglomerate |  | Ex. 39 |  |  | Ex. 37 |  |  |
| First Agglomerate % |  | 3.50 |  |  | 5.39 |  |  |
| Second Agglomerate | Ex. 49 | Ex. 50 | Ex. 52 |  | Ex. 53 |  |  |
| Second Agglomerate % | 15.83 | 12.35 | 17.20 |  | 5.39 |  |  |
| Third Agglomerate |  |  |  | Ex. 62 | Ex. 63 |  |  |
| Third Agglomerate % |  |  |  | 45.49 | 20.53 |  |  |
| Third Agglomerate + First Coating + First Layer |  |  |  |  |  |  |  |
| Third Agglomerate |  |  |  |  |  | Ex. 64 |  |
| Third Agglomerate % |  |  |  |  |  | 9.99 |  |
| First Coating |  |  |  |  |  | Ex. 41 |  |
| First Coating % |  |  |  |  |  | 6.07 |  |
| First Layer |  |  |  |  |  | Ex. 55 |  |
| First Layer % |  |  |  |  |  | 1.96 |  |
| Filler | Ex. 76 | Ex. 83 | Ex. 84 | Ex. 81 | Ex. 79 | Ex. 81 | Ex. 80 |
| Filler % | QS | QS | QS | QS | QS | QS | QS |
| Optional Ingredients | Ex. 72 | Ex. 74 |  | Ex. 75 | Ex. 75 | Ex. 70 |  |
| Optional Ingredients % | 5.80 | 5.81 |  | 5.80 | 5.93 | 6.76 |  |
| Weight Fraction | 0.513 | 0.512 | 0.471 | 0.513 | 0.503 | 0.433 | 0.414 |
| Base food moisture content | 59.23 | 59.23 | 59.23 | 59.23 | 59.23 | 59.23 | 59.23 |
| Base food density, g/cc |  |  |  |  |  |  |  |
| Base food volume, g/cc |  |  |  |  |  |  |  |
| Consistency Value (Pa-sn) of Filler |  | .0009 |  |  |  |  |  |
| Shear Index (1/s) of Filler |  | 1.0 |  |  |  |  |  |

Examples 8-14 can be prepared using sequential batch tumbling to coat and layer the base food. The base foods are agglomerated by heat setting the coated and layered base foods in a steam tunnel to 67° C. center temperature while the coated and/or layered base foods are in contact with each other. The agglomerates are mixed with the filler and optional ingredients to prepare a coated pet food product, packed and rendered shelf stable by retort.

|  | Wet Pet Food Product Examples: | | | | | | |
| --- | --- | --- | --- | --- | --- | --- | --- |
|  | Ex. 15 | Ex. 16 | Ex. 17 | Ex. 18 | Ex. 19 | Ex. 20 | Ex. 21 |
| Base food |  |  |  |  |  | Ex. 24 |  |
| Base food % |  |  |  |  |  | 11.59 |  |

-continued

| | Wet Pet Food Product Examples: | | | | | | |
|---|---|---|---|---|---|---|---|
| | Ex. 15 | Ex. 16 | Ex. 17 | Ex. 18 | Ex. 19 | Ex. 20 | Ex. 21 |
| Base food + First Coating | | | | | | | |
| Base Food | | | | | | Ex. 24 | |
| Base food % | | | | | | 2.33 | |
| First Coating | | | | | | Ex. 45 | |
| First Coating % | | | | | | 0.31 | |
| Base food + First Layer | | | | | | | |
| Base Food | | | | | | Ex. 24 | |
| Base food % | | | | | | 2.43 | |
| First Layer | | | | | | Ex. 59 | |
| First Layer % | | | | | | 0.20 | |
| Base food + First Coating + First Layer | | | | | | | |
| Base Food | | | | | | Ex. 24 | |
| Base food % | | | | | | 2.01 | |
| First Coating | | | | | | Ex. 45 | |
| First Coating % | | | | | | 0.26 | |
| First Layer | | | | | | Ex. 59 | |
| First Layer % | | | | | | 0.36 | |
| Base food + First Coating + First Layer + Second Coating | | | | | | | |
| Base Food | Ex. 22 | Ex. 22 | Ex. 22 | Ex. 22 | Ex. 24 | Ex. 24 | Ex. 28 |
| Base food % | 10.80 | 21.62 | .0073 | 10.80 | 10.80 | 8.52 | 73.56 |
| First Coating | Ex. 41 | Ex. 41 | Ex. 41 | Ex. 41 | Ex. 45 | Ex. 45 | Ex. 41 |
| First Coating % | 1.41 | 2.83 | .0010 | 1.41 | 1.41 | 1.12 | 9.65 |
| First Layer | Ex. 55 | Ex. 55 | Ex. 55 | Ex. 55 | Ex. 59 | Ex. 59 | Ex. 55 |
| First Layer % | 1.94 | 3.87 | .0013 | 1.94 | 1.94 | 1.53 | 13.18 |
| Second Coating | Ex. 41 | Ex. 41 | Ex. 41 | Ex. 41 | Ex. 45 | Ex. 45 | Ex. 41 |
| Second Coating % | 0.53 | 1.06 | .0003 | 0.53 | 0.53 | 0.42 | QS |
| First Coating + First Layer | | | | | | | |
| First Coating | | | Ex. 41 | | | Ex. 45 | |
| First Coating % | | | .0042 | | | 0.67 | |
| First Layer | | | Ex. 55 | | | Ex. 59 | |
| First Layer % | | | .0058 | | | 0.91 | |
| First Coating + First Layer + Second Coating | | | | | | | |
| First Coating | Ex. 41 | Ex. 45 | | Ex. 41 | Ex. 45 | Ex. 45 | |
| First Coating % | 0.75 | 1.50 | | 0.75 | 0.75 | 0.59 | |
| First Layer | Ex. 55 | Ex. 55 | | Ex. 55 | Ex. 59 | Ex. 59 | |
| First Layer % | 1.02 | 2.04 | | 1.02 | 1.02 | 0.81 | |
| Second Coating | Ex. 41 | Ex. 41 | | Ex. 41 | Ex. 45 | Ex. 45 | |
| Second Coating % | 0.24 | 0.47 | | 0.24 | 0.24 | 0.19 | |
| First Agglomerate | Ex. 37 | Ex. 37 | | Ex. 38 | Ex. 37 | Ex. 38 | |
| First Agglomerate % | 5.04 | 10.09 | | 5.04 | 5.04 | 3.98 | |
| Second Agglomerate | Ex. 48 | Ex. 48 | Ex. 48 | Ex. 51 | Ex. 48 | Ex. 51 | |
| Second Agglomerate % | 5.04 | 10.09 | .0100 | 5.04 | 5.04 | 3.98 | |
| Third Agglomerate | Ex. 65 | Ex. 65 | | Ex. 67 | Ex. 68 | Ex. 66 | |
| Third Agglomerate % | 19.19 | 38.41 | | 19.19 | 19.19 | 15.14 | |
| (A) Filler | Ex. 81 | Ex. 78 | Ex. 81 | Ex. 80 | Ex. 81 | Ex. 80 | |
| (B) Filler | | | | Ex. 81 | Ex. 80 | | |
| (A) Filler % | QS | QS | QS | 25.03 | 25.03 | QS | |
| (B) Filler % | | | | QS | QS | | |
| Optional Ingredients | Ex. 73 | Ex. 73 | | Ex. 72 | Ex. 72 | Ex. 72 | |
| Optional Ingredients % | 4.00 | 8.02 | | 4.00 | 4.00 | 3.16 | |
| Solids Fraction | .635 | | | | | .690 | |
| Weight Fraction | .500 | 1.000 | .0003 | .500 | .500 | .605 | 1.000 |
| Base food moisture content | 59.23 | 59.23 | 59.23 | 59.23 | 59.23 | 59.23 | |
| Base food density, g/cc | 1.08 | | | | | 1.06 | |
| Base food volume, cc | 2.94 | | | | | 3.09 | |
| Consistency Value (Pa-sn) of Filler | 8.7 | | | | | 2.8 | |
| Shear Index (1/s) of Filler | 2.8 | | | | | 0.58 | |

Examples 15-20 are prepared using sequential continuous enrobing to coat and layer the base foods. The coated base foods are agglomerated by heat setting the coated and layered base foods in a steam tunnel to 67° C. center temperature while the coated and/or layered base foods are in contact with each other. The agglomerates are mixed with the filler and optional ingredients to prepare a wet pet food product, packed and rendered shelf stable by retort. Examples 15-20, excess of coating and layer materials which has not attached itself to a base food is processed with the coated and layered base food, and is mixed into the wet pet food.

| | Base food Examples: | | | | | | | |
|---|---|---|---|---|---|---|---|---|
| (Type) Ingredient | Ex. 22 | Ex. 23 | Ex. 24 | Ex. 25 | Ex. 26 | Ex. 27 | Ex. 28 | Ex. 29 |
| (Z) Water | 6.28 | 3.32 | 14.65 | 6.25 | 6.28 | | | |
| (Y) Chicken, comminuted | 53.95 | 28.53 | 66.93 | 53.68 | 53.9 | | | |
| (Z) Wet Textured Wheat Protein (Water, Wheat Gluten, Wheat Flour, Caramel, Phosphate, Antioxidants) | | 32.57 | | | | | | |
| (Y) Beef | 23.49 | 12.42 | | | | | | |
| (Y) Salmon | | | | 23.38 | | | | |
| (Y) Kangaroo | | | | | 23.5 | | | |
| (Z) Carrots, 6.4 mm cube | | 6.86 | | | | | | |
| (Z) Peas | | 4.52 | | | | | | |
| (Z) Dehydrated Potato 9.5 mm cube | | 3.18 | | | | | | |
| (X) Animal Plasma APC, Inc. Ames, IA | 4.28 | 2.26 | 4.68 | 4.26 | 4.27 | | | |
| (X) Beet Pulp | 3.523 | 1.863 | 3.648 | 3.506 | 3.52 | | | |
| (X) Calcium Carbonate | 1.60 | 0.846 | 1.67 | 1.59 | 1.60 | | | |
| (X) Sodium Tripolyphosphate Astaris, St. Louis, Mo | 1.25 | 0.66 | 1.37 | 1.24 | 1.25 | | | |
| (X) L-Lysine | 0.811 | 0.429 | 1.040 | 0.807 | 0.81 | | | |
| (X) Potassium Chloride | 0.806 | 0.426 | 0.881 | 0.802 | 0.81 | | | |
| (X) Choline Chloride | 0.528 | 0.279 | 0.516 | 0.525 | 0.53 | | | |
| (X) Vitamins | 0.487 | 0.257 | 0.504 | 0.485 | 0.49 | | | |
| (X) Onion Powder | 0.374 | 0.198 | 0.394 | 0.373 | 0.37 | | | |
| (X) Trace Minerals | 0.371 | 0.196 | 0.375 | 0.370 | 0.37 | | | |
| (X) Salt | 0.362 | 0.191 | 0.375 | 0.360 | 0.36 | | | |
| (Y) Fish Oil | 1.005 | 0.532 | 1.256 | 1.000 | 1.01 | | | |
| (X) DL-Methionine | 0.096 | 0.051 | 0.162 | 0.096 | 0.10 | | | |
| (X) Garlic Powder | 0.125 | 0.066 | 0.197 | 0.125 | 0.13 | | | |
| (Y) Mixed Tocopherols | 0.071 | 0.037 | 0.070 | 0.070 | 0.07 | | | |
| (X) Iron Chelate 20% Albion, UT | 0.061 | 0.032 | 0.069 | 0.060 | 0.06 | | | |
| (X) Citric Acid | QS | QS | QS | QS | QS | | | |
| (X) Celery Powder | | | 0.134 | | | | | |
| Dried Cod | | | | | | 100 | | |
| Beef Jerky | | | | | | | 100 | |
| Broiled Duck Breast | | | | | | | | 100 |
| Colorant | | | | | | | | |
| (X) FD&C Yellow 5 | | | | 0.83 | | | | |
| (X) FD&C Red 40 | | | | 0.17 | 0.08 | | | |
| (X) Titanium dioxide powder | | | 1.05 | | | | | |
| (X) Malt | 0.50 | 0.27 | | | 0.50 | | | |
| Base food moisture content | | | | | | | | 23.4 |

Examples 22-26 and 30-33

Examples 22-26 and 30-33 can be made in the following manner. All ingredients of Type (X) can be prepared as a dry batch by conventional dry blending. Animal protein (salmon, kangaroo, beef, chicken) ingredients of Type (Y) can be frozen until use and ground using a conventional meat grinder through a 9.5 millimeter diameter hole grinding plate. All ingredients of Type (Y) can be prepared as a wet batch by conventional mixing, the temperature not exceeding 0° C. during mixing. Mix Type (X) dry batch and all Type (Z) ingredients into Type (Y) wet batch using conventional mixing techniques; the temperature not exceeding 0° C. during mixing. Hereafter the Meat Slurry is the X+Y+Z mixture.

The Meat Slurry can be shaped to form ropes measuring 15.8 mm×15.8 mm×1000 mm using an extruder with an extrusion die plate and an orifice measuring 15.8 mm×15.8 mm. Extrusion equipment (Selo Food Technology B.V., Holland, or equivalent) can be integrated for continuous and sequential use with a belt equipped steam tunnel (Selo Food Technology B.V., Holland, or equivalent). The base food can be prepared by heating until a center temperature of 67° C. is reached as measured using a handheld temperature probe (e.g. VWR Corning® model 310). Heating is under saturated steam at atmospheric pressure (100° C.) and reducing the largest dimension to the final size using a continuous dicer (Carruthers Equipment Co, Warrenton, Oreg., or equivalent). Base food is cooled to 4° C. on covered stainless steel cooling trays.

Examples 22, 23, 24, 25, and 26 can use various animal and plant protein sources to comprise base food. Further Example 23 can use of vegetables in the base food.

Examples 27, 28, and 29 can use various ingredients that can comprise, but not limited to, the base food. The method and preparation of these ingredients are common to the industry that supplies these ingredients.

Examples 30-33 can use hydrocolloid and/or gum systems to manage moisture content in base food; these systems or combinations thereof are non-limiting.

| | Base food Examples: | | | | | | |
|---|---|---|---|---|---|---|---|
| | Ex. 30 | Ex. 31 | Ex. 32 | Ex. 33 | Ex. 34 | Ex. 35 | Ex. 36 |
| (Z) Water | 7.49 | 17.57 | 25.72 | 37.95 | | | |
| (X) Spray Dried Beef Broth | 0.51 | 0.45 | 0.41 | 0.34 | | | |
| (Y) CHICKEN, Comminuted | 62.86 | 56.01 | 50.47 | 42.16 | | | |
| (Y) Beef | 16.25 | 14.48 | 13.04 | 10.90 | | | |
| (X) Gaur Gum Ph-8/24 Tic Gums, Belcamp, MD | 0.42 | 0.38 | 0.34 | 0.28 | | | |
| (X) TICAXAN Xanthan Powder TIC Gums, Belcamp, MD | 0.039 | 0.035 | 0.031 | 0.026 | | | |
| (X) Animal Plasma APC, Inc. Ames, IA | 3.25 | 2.90 | 2.61 | 2.18 | | | |
| (X) Beet Pulp | 2.437 | 2.172 | 1.957 | 1.635 | | | |
| (X) Calcium Carbonate | 0.886 | 0.790 | 0.712 | 0.594 | | | |
| (X) Sodium Tripolyphosphate Astaris, St. Louis, MO | 1.66 | 1.48 | 1.33 | 1.11 | | | |
| (X) L-Lysine | 0.145 | 0.129 | 0.116 | 0.097 | | | |
| (X) Potassium Chloride | 0.552 | 0.492 | 0.443 | 0.370 | | | |
| (X) Vitamins | 0.479 | 0.427 | 0.384 | 0.321 | | | |
| (X) Onion Powder | 0.284 | 0.253 | 0.228 | 0.191 | | | |
| (X) Trace Minerals | 0.296 | 0.264 | 0.237 | 0.198 | | | |
| (X) Salt | 0.474 | 0.422 | 0.381 | 0.318 | | | |
| (Y) Fish Oil | 0.374 | 0.334 | 0.301 | 0.251 | | | |
| (X) DL-Methionine | 0.129 | 0.115 | 0.104 | 0.086 | | | |
| (X) Garlic Powder | 0.095 | 0.084 | 0.076 | 0.064 | | | |
| (Y) Mixed Tocopherols | 0.047 | 0.042 | 0.038 | 0.032 | | | |
| (X) Citric Acid | QS | QS | QS | QS | | | |
| (X) Dried Egg Product Colorant | 0.650 | 0.579 | 0.522 | 0.436 | | | |
| (X) Caramel | 0.005 | 0.004 | 0.004 | 0.003 | | | |
| (X) Malt | 0.65 | 0.58 | 0.53 | 0.44 | | | |
| Diced mackerel | | | | | 100 | | |
| Diced beef (B) | | | | | | 50.0 | |
| Diced chicken (C) | | | | | | QS | 100 |
| Total | 105.6 | 118.4 | 131.4 | 157.3 | 58.72 | 117.4 | 58.72 |
| Base food moisture content | 61.8 | 65.9 | 69.3 | 74.3 | | 53.50 (B); 72.54 (C) | 72.54 |

Examples 27-29, 34-36

Examples 27, 28, 29, 34, 35, and 36 can use a commodity source of animal protein as base foods. Mackeral, beef, or chicken are diced using commercial slicing/dicing equipment to 1.6 cm cubes.

| | First Agglomerate Examples: | | | |
|---|---|---|---|---|
| | Ex. 37 | Ex. 38 | Ex. 39 | Ex. 40 |
| Textured wheat protein Wheatex ® 1504DC (dark caramel color) MGP Ingredients, Atchison, KS | 32.35 | | | |
| Textured wheat protein Wheatex ® 1502C (light caramel color) MGP Ingredients, Atchison, KS | | | | 32.35 |
| Textured wheat protein Wheatex ® 1501 (light tan color) MGP Ingredients, Atchison, KS | | 32.35 | | |
| Textured wheat protein Wheatex ® 1505W (bright white color) MGP Ingredients, Atchison, KS | | | 32.35 | |
| Water (preferred 65° C.) | QS | QS | QS | QS |

|  | Coating Examples: | | | | | | |
|---|---|---|---|---|---|---|---|
|  | Ex. 41 | Ex. 42 | Ex. 43 | Ex. 44 | Ex. 45 | Ex. 46 | Ex. 47 |
| Water | QS | QS | QS | QS | QS | QS | QS |
| Egg White Solids (powder) Ballas Egg Products Corp., Zanesville, OH | 17.85 | | | | 16.01 | | |
| Mixed Berry Rice Protein (powder) (enzymatically processed rice protein from brown rice, natural flavor, guar gum, xanthan gum) NutriBiotic, Lakeport, CA | | 13.33 | | | | | |
| Whey Protein (micro-filtered and ion-exchanged whey protein isolates, hydrolyzed whey protein concentrate, natural vanilla flavor, free form amino acids (L-glutamine, L-leucine, L-isoleucine, L-valine), stevia) Show Me The Whey ®, Dorothy Lane Market, Dayton, OH | | | 18.18 | | | | |
| ENER-G ® Egg Replacer (potato starch, tapioca flour, leavening (calcium lactate, calcium carbonate, citric acid), cellulose gum, carbohydrate gum) ENER-G Foods, Inc. Seattle, WA | | | | 18.18 | | | |
| Stone Ground Corn flour + White sorghum flour 50:50 mixture (whole grain organic corn, whole grain sweet white sorghum) Bob's Red Mill Natural Foods, Milwaukie, OR | | | | | 2.00 | | |
| Soy protein isolate powder. Bob's Red Mill, Milwaukie, OR. | | | | | | 18.00 | |
| Soy flour (stone ground whole grain soy flour) Bob's Red Mill Natural Foods, Milwaukie, OR. | | | | | | | 18.00 |
| Salt | | | | | 0.99 | 0.99 | 0.99 |
| Colorant: Malt | 1.79 | | | | | | |

|  | Second Agglomerate Examples: | | | | | | |
|---|---|---|---|---|---|---|---|
|  | Ex. 48 | Ex. 49 | Ex. 50 | Ex. 51 | Ex. 52 | Ex. 53 | Ex. 54 |
| Hydrated and Shredded Textured wheat protein Wheatex ® 1504DC (dark caramel color) | 82.26 | | | | | | |
| Hydrated and Shredded Textured wheat protein Wheatex ® 1502C (light caramel color) | | | | | 82.26 | | |
| Shredded Textured wheat protein Wheatex ® Redishred 65W (light tan color) MGP Ingredients, Atchison, KS | | 82.26 | | | | | |
| Hydrated and Shredded Textured wheat protein Wheatex ® 1505W (bright white color) | | | | 82.26 | | | |
| Hyrdrated and Shredded Textured wheat protein TWP#139W | | | | | | 82.26 | |
| Hydrated and Shredded Textured soy protein (water, defatted soy flour, FD&C Yellow 5, FD&C Red 40) | | | | | | | 82.26 |

-continued

| | | | | | | | |
|---|---|---|---|---|---|---|---|
| Hydrated and Shredded Textured soy protein (water, soy concentrate, FD&C Yellow 5, FD&C Red 40) | | | | | | | 82.26 |
| Water | QS | QS | QS | QS | QS | QS | QS |
| Egg White Solids (powder) Ballas Egg Products Corp, Zanesville, OH | 3.22 | 3.22 | 3.22 | 3.22 | 3.22 | 3.22 | 3.22 |
| Colorant: Caramel | 0.32 | | | | | | |

| | Layer Examples: | | | | | | |
|---|---|---|---|---|---|---|---|
| | Ex. 55 | Ex. 56 | Ex. 57 | Ex. 58 | Ex. 59 | Ex. 60 | Ex. 61 |
| Ground Wheatex ® 1504DC (dark caramel color) | 100 | | | | | 75 | |
| Ground Textured wheat protein Wheatex ® 1502C (light caramel color) | | | | | | 20 | |
| Shredded Textured wheat protein Wheatex ® Redishred 65W (light tan color) MGP Ingredients, Atchison, KS | | | | 70 | 100 | | |
| Ground Textured wheat protein Wheatex ® 1505W (bright white color) | | 99 | 5 | | | | |
| Ground Textured wheat protein TWP#139W | | | | | | | 90 |
| Ground Textured soy protein (defatted soy flour, FD&C Yellow 5, FD&C Red 40) | | | | 5 | | | |
| Ground Textured soy protein (soy concentrate, FD&C Yellow 5, FD&C Red 40) | | | 75 | | | | |
| Wheat flour | | | 10 | 20 | | | |
| Corn Starch | | | 6 | QS | | | |
| Optional Additional Ingredients | | | 3 | | | QS | |
| Colorant | | | | | | | |
| Caramel | | | | | | | QS |
| FD&C Yellow 6 | | QS | | | | | |
| Titanium dioxide powder | | 0.75 | QS | | | | |
| Malted barley flour | | | | | | | 6 |

| | Third Agglomerate Examples: | | | | | | |
|---|---|---|---|---|---|---|---|
| | Ex. 62 | Ex. 63 | Ex. 64 | Ex. 65 | Ex. 66 | Ex. 67 | Ex. 68 |
| Hydrated and Shredded Textured wheat protein Wheatex ® 1504DC (dark caramel color) | 15.09 | | | 62.59 | | 31.30 | 31.30 |
| Hydrated and Shredded Textured wheat protein Wheatex ® 1502C (light caramel color) | 7.54 | | | | | | |
| Shredded Textured wheat protein Wheatex ® Redishred 65W (light tan color) MGP Ingredients, Atchison, KS | 7.54 | | | | 62.59 | 31.30 | 31.30 |
| Hydrated and Shredded Textured wheat protein Wheatex ® 1505W (bright white color) | | 6.00 | | | | | |
| Hyrdrated and Shredded Textured wheat protein TWP#139W | | 9.99 | | | | | |
| Hydrated and Shredded Textured soy protein (water, defatted soy flour, FD&C Yellow 5, FD&C Red 40) | | | 14.81 | | | | |
| Hydrated and Shredded Textured soy protein (water, soy concentrate, FD&C Yellow 5, FD&C Red 40) | | | 14.81 | | | | |

-continued

| | | | | | | | |
|---|---|---|---|---|---|---|---|
| Water | 12.39 | 6.57 | 12.16 | 10.82 | 10.82 | 10.82 | 10.82 |
| Egg White Solids (powder) Ballas Egg Products Corp., Zanesville, OH | 2.75 | 1.46 | 2.70 | 2.40 | 2.40 | 2.40 | 2.40 |
| Base food from Ex. 33 | 54.68 | | | | | | |
| Base food + First Coating + First Layer + Second Coating | | 31.98 | | | | | |
| Base Food | | | Ex. 31 | | Ex. 22 | Ex. 24 | Ex. 24 | Ex. 22 |
| Base food % | | | 32.38 | | 17.79 | 17.79 | 17.79 | 17.79 |
| First Coating | | | Ex. 41 | | Ex. 41 | Ex. 45 | Ex. 45 | Ex. 41 |
| First Coating % | | | 4.23 | | 2.32 | 2.32 | 2.32 | 2.32 |
| First Layer | | | Ex. 55 | | Ex. 55 | Ex. 59 | Ex. 59 | Ex. 55 |
| First Layer % | | | 5.82 | | 3.20 | 3.20 | 3.20 | 3.20 |
| Second Coating | | | Ex. 41 | | Ex. 41 | Ex. 45 | Ex. 45 | Ex. 41 |
| Second Coating % | | | 1.59 | | 0.87 | 0.87 | 0.87 | 0.87 |
| Second Agglomerate from Ex. 54 | | | | 27.76 | | | | |
| Second Agglomerate from Ex. 54 | | | | 27.76 | | | | |

Optional Ingredients Examples:

| | Ex. 69 | Ex. 70 | Ex. 71 | Ex. 72 | Ex. 73 | Ex. 74 | Ex. 75 |
|---|---|---|---|---|---|---|---|
| Diced Carrots | | 47 | | QS | | | 33 |
| Frozen Peas | | 31.3 | | | | | |
| Dehydrated Diced Potatoes | | QS | | | | 50 | |
| Diced Potatoes | | | 33 | | | | |
| Dehydrated Vegetable | 25 | | | | | | |
| Fresh Vegetable | 25 | | | | | | |
| Frozen Vegetable | QS | | | | | | |
| Wild rice | | | | 12.5 | | | 33 |
| Minced Corn | | | 33 | | | | |
| Cut Green Beans | | | QS | 33.5 | | | |
| Minced Strawberries | | | | | 25 | | |
| Minced Cranberries | | | | | 25 | QS | |
| Minced Cherries | | | | | QS | | |
| Diced Tomato | 25 | | | | | | |
| Diced Apple | | | | | 25 | | QS |

Filler Examples:

| | Ex. 76 | Ex. 77 | Ex. 78 | Ex. 79 | Ex. 80 | Ex. 81 | Ex. 82 | Ex. 83 | Ex. 84 | Ex. 85 |
|---|---|---|---|---|---|---|---|---|---|---|
| Gravy Mix with Beef flavor (A) | | | | | | 8 | 7 | | | |
| Gravy Mix with Chicken flavor | | | | | 8 | | | | | |
| Water | 100 | QS | | QS | QS | QS | QS | QS | | QS |
| Nitrogen | | | 99 | | | | | | | |
| Air | | | QS | | | | | | | |
| Spray Dried Fish Broth | | | | | | | | 2.3 | | |
| Dehydrated Tomato Juice | | | | 4 | | | | | | |
| Apple Puree | | | | | | | 5 | | | |
| Gelatin Solids | | | | 14 | | | | | | |
| Beet Juice | | | | 3 | | | | | | |
| Whole Egg Solids | | 23 | | | | | | | | |
| Chicken, comminuted | | | | | | | | | | 80 |
| Colorant: Titanium dioxide | | | | | | | | | | 0.75 |
| Colorant: FD&C Red#40 | | | | | | | | | | 0.4 |
| Iams Savory Sauce ®* | | | | | | | | | 100 | |

*ingredients: Country Style Chicken (Chicken Broth, Chicken, Chicken Fat (preserved with Mixed Tocopherols, a source of Vitamin E, and Citric Acid), Sodium Bisulfate, Xanthan Gum, Chicken Flavors, Dried Beet Pulp (sugar removed), Potassium Sorbate (a preservative), Brewers Dried Yeast, Flax Meal, Carrots, Peas, Vitamins (Vitamin E Supplement, Ascorbic Acid, Vitamin A Acetate, Calcium Pantothenate, Biotin, Thiamine Mononitrate (source of vitamin B1), Vitamin B12 Supplement, Niacin, Riboflavin Supplement (source of vitamin B2), Inositol, Pyridoxine Hydrochloride (source of vitamin B6), Vitamin D3 Supplement, Folic Acid), Potassium Chloride, Minerals (Ferrous Sulfate, Zinc Oxide, Manganese Sulfate, Copper Sulfate, Manganous Oxide, Potassium Iodide, Cobalt Carbonate), Rosemary Extract) Procter & Gamble, Cincinnati, OH Examples 81 and 82 can contain the Gravy Mix with Beef Flavor (A), Kerry Ingredients, Beloit, Wis.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A first wet pet food product comprising:
   (a) a first base food, the first base food having a volume of from about 0.256 cubic centimeters to about 16.4 cubic centimeters;
   (b) a first layer; wherein the first layer comprises a plurality of particles adhered together to form the first layer, wherein the particle size is about 5 to about 600 microns; and wherein the first layer is selected from the group consisting of plant protein, farinaceous matter, vegetables, fruit, and combinations thereof; and
   wherein said first layer is bonded with said base food using a coating, wherein said coating comprises a binder comprising egg whites.

2. The wet pet food product of claim 1, wherein said base food has a shape selected from the group consisting of cube, spherical, geometric, axially elongated, and combinations thereof.

3. The wet pet food product of claim 1, wherein said base food comprises a structurant.

4. The wet pet food product of claim 1, wherein said structurant is selected from the group consisting of animal protein, plant protein, farinaceous matter, vegetables and combinations thereof.

5. The wet pet food product of claim 4, wherein said plant protein is selected from the group of textured wheat protein, textured soy protein, textured lupin protein, pasta, and combinations thereof.

6. The wet pet food product of claim 4, wherein said animal protein is selected from the group of beef, chicken, kangaroo, pork, lamb, shell fish, crustaceans, fish, and combinations thereof.

7. The wet pet food product of claim 1, further comprising an agglomerate comprising a plurality of particles.

8. The wet pet food product of claim 7, wherein said agglomerate has a Volume of from about 0.004 cc to about 3600 cc.

9. The wet pet food product of claim 7, wherein said agglomerate is bonded to said base food.

10. The wet pet food product of claim 1, wherein said wet pet food product is housed in a containing device comprising a substantially transparent portion suitable for viewing said pet food product.

11. The wet pet food product of claim 1, further comprising at least one vegetable that is selected from the group consisting of carrots, peas, potatoes cabbage, onion, garlic, celery, beans, corn, broccoli, cauliflower, leeks, and combinations thereof.

12. The wet pet food product of claim 1, further comprising at least one fruit that is selected from the group consisting of tomatoes, apples, avocado, pears, peaches, cherries, apricots, plums, grapes, oranges, grapefruit, lemons, limes, cranberries, raspberries, blueberries, watermelon, cantaloupe, mushmellon, honeydew melon, strawberries, banana, and combinations thereof.

13. The wet pet food product of claim 1, further comprising a filler selected from the group consisting of gravy, gel, jelly, aspic, water, sauce, broth, air, and combinations thereof.

14. The wet pet food product of claim 1, further comprises a component selected from the group consisting of flavorants, seasonings, salts, colorants, time-release compounds, minerals, vitamins, antioxidants, prebiotics, probiotics, aroma modifiers, and combinations thereof.

15. The wet pet food product of claim 14, wherein said colorant is selected from synthetic or natural colorants, and any combination thereof.

16. The wet pet food product of claim 1, wherein said pet food product is complete and nutritionally balanced.

17. A wet pet food product comprising:
   (a) a base food comprising a structurant comprising a steam tunnel meat, the base food having a volume of from about 0.256 cubic centimeters to about 16.4 cubic centimeters;
   (b) a first layer comprising textured wheat protein, wherein the first layer comprises a plurality of particles adhered together to form the first layer, wherein the particle size is about 5 to about 600 microns;
   (c) a coating associated with said base food; and
   wherein said first layer is bonded with said base food using a coating, wherein said coating comprises a binder comprising egg whites.

18. The wet pet food product of claim 17, wherein said textured wheat protein is shredded from about 0.005 millimeters to about 50 millimeters, as measured in at least one axis.

19. The wet pet food product of claim 17, further comprising an agglomerate comprising a plurality of particles comprising textured wheat protein.

20. The wet pet food product of claim 19, wherein said agglomerate is bonded to said base food.

21. A wet pet food product in accordance with claim 17, further comprising a second layer comprising animal protein, plant protein, farinaceous matter, vegetables, fruits and combinations thereof.

22. The wet pet food product of claim 17, further comprising a second agglomerate.

23. A process for preparing the wet pet food product of claim 1, the process comprising:
   (a) providing the base food having a volume of from about 0.256 cubic centimeters to about 16.4 cubic centimeters;
   (b) providing the first layer comprising particles adhered together to form the first layer, wherein the particle size is about 5 to about 600 microns
   (c) bonding said base food and said first layer using the coating which comprises the binder comprising egg whites; and
   (d) heating said pet food product until all microbes are killed.

24. The process of claim 23, further comprising:
   heating said pet food product until said coating is heat set.

25. The wet pet food product of claim 1 wherein the base food comprises animal protein.

26. The wet pet food product of claim 1, further comprising a second wet pet food composition comprising a second base food, wherein the second base food comprises a material selected from the group consisting of plant protein, farinaceous matter, vegetables, fruit, and combinations thereof.

* * * * *